US007704397B2

(12) United States Patent
Meddock et al.

(10) Patent No.: US 7,704,397 B2
(45) Date of Patent: *Apr. 27, 2010

(54) COAXIAL FULL-FLOW AND BYPASS OIL FILTER HAVING CAP WITH BLADES

(75) Inventors: Leroy J. Meddock, Santa Ana, CA (US); Mark T. Meddock, Oceanside, CA (US); Kenneth Swanson, Rancho Santa Fe, CA (US)

(73) Assignee: Filtran LLC, Des Plaines, IL (US)

( * ) Notice: Subject to any disclaimer, the term of this patent is extended or adjusted under 35 U.S.C. 154(b) by 574 days.

This patent is subject to a terminal disclaimer.

(21) Appl. No.: 11/471,549

(22) Filed: Jun. 21, 2006

(65) Prior Publication Data

US 2006/0278570 A1   Dec. 14, 2006

Related U.S. Application Data

(60) Division of application No. 11/335,832, filed on Jan. 20, 2006, which is a continuation-in-part of application No. 10/734,977, filed on Dec. 15, 2003, now Pat. No. 7,090,773.

(51) Int. Cl.
  *B01D 27/14*   (2006.01)
(52) U.S. Cl. ................. 210/338; 210/342; 210/DIG. 13
(58) Field of Classification Search .......... 210/DIG. 13, 210/342, 416.5, 338, 315, 450
See application file for complete search history.

(56) References Cited

U.S. PATENT DOCUMENTS

| 2,057,219 A | 10/1936 | Vokes | 210/165 |
|---|---|---|---|
| 2,271,054 A | 1/1942 | Williams | 210/131 |
| 2,328,131 A | 8/1943 | Eisler | 177/311 |
| 2,680,520 A | 6/1954 | Beardsley | 210/164 |
| 2,734,636 A | 2/1956 | Foster | 210/164 |
| 2,748,949 A | 5/1956 | James | 210/183 |
| 2,843,268 A | 7/1958 | Kennedy | 210/295 |
| 2,879,892 A | 3/1959 | Frakes | 210/90 |
| 2,929,506 A | 3/1960 | Belgarde | 210/315 |
| 2,995,253 A | 8/1961 | Belgarde et al. | 210/323 |
| 3,073,451 A | 1/1963 | Stephenson | 210/85 |
| 3,127,255 A | 3/1964 | Winslow | 55/178 |

(Continued)

FOREIGN PATENT DOCUMENTS

DE   1253951   11/1967

(Continued)

OTHER PUBLICATIONS

European Search Report dated Mar. 29, 2007 (attached to Communication from the European Patent Office, dated Apr. 5, 2007).

*Primary Examiner*—Terry K Cecil
(74) *Attorney, Agent, or Firm*—Kramer & Amado, P.C.

(57) ABSTRACT

A fluid filter includes a first filter, a second filter coaxial with the first filter, an inlet adjacent the first and second filters, a first outlet adjacent the inlet, and a second outlet at a distal end from the inlet and the first outlet. Further, the first and second filters may be housed in a unitary canister or a canister that has a canister body coupled to a removable canister cap. The bypass flow filter includes a cap having a plurality of blades.

6 Claims, 8 Drawing Sheets

U.S. PATENT DOCUMENTS

| | | | |
|---|---|---|---|
| 3,262,565 A | 7/1966 | Silverwater | 210/90 |
| 3,269,541 A | 8/1966 | Neely | 210/132 |
| 3,586,171 A | 6/1971 | Offer | 210/136 |
| 3,868,327 A | 2/1975 | Van Gilder et al. | 210/457 |
| 3,941,958 A | 3/1976 | Flesburg | 200/82 |
| 4,036,755 A | 7/1977 | Dahm et al. | 210/168 |
| 4,288,030 A | 9/1981 | Beazley et al. | 233/23 |
| 4,400,167 A | 8/1983 | Beazley et al. | 494/49 |
| 4,452,695 A | 6/1984 | Schmidt | 210/168 |
| 4,454,037 A | 6/1984 | Conterio et al. | 210/120 |
| 4,524,733 A | 6/1985 | Schmidt | 210/196 |
| 4,561,395 A | 12/1985 | McMullen | 210/196 |
| 4,629,558 A | 12/1986 | Garritty | 210/130 |
| 4,640,772 A | 2/1987 | Graham | 210/295 |
| 4,672,932 A | 6/1987 | Schmidt | 123/196 |
| 4,738,776 A | 4/1988 | Brown | 210/168 |
| 4,802,979 A | 2/1989 | Medley | 210/132 |
| 4,812,230 A | 3/1989 | Gerulis | 210/108 |
| 4,818,385 A | 4/1989 | Medley, III | 210/90 |
| 4,851,117 A | 7/1989 | Foust | 210/236 |
| 4,885,082 A | 12/1989 | Cantoni | 210/90 |
| 4,897,186 A | 1/1990 | Gerulis | 210/108 |
| 4,976,854 A | 12/1990 | Yano et al. | 210/168 |
| 4,997,556 A | 3/1991 | Yano et al. | 210/136 |
| 5,066,391 A | 11/1991 | Faria | 210/85 |
| 5,070,831 A | 12/1991 | Yunick | 123/196 |
| 5,076,918 A | 12/1991 | Foust et al. | 210/238 |
| 5,078,877 A | 1/1992 | Cudabeck | 210/315 |
| 5,110,460 A | 5/1992 | Gilas | 210/149 |
| 5,180,490 A | 1/1993 | Eihusen et al. | 210/239 |
| RE34,274 E | 6/1993 | Foust | 210/236 |
| 5,230,795 A | 7/1993 | Yang | 210/236 |
| 5,246,086 A | 9/1993 | Yunick | 184/1.5 |
| 5,259,953 A | 11/1993 | Baracchi et al. | 210/232 |
| 5,342,511 A | 8/1994 | Brown et al. | 210/137 |
| 5,366,400 A | 11/1994 | Kucik | 440/88 |
| 5,431,588 A | 7/1995 | Kucik | 440/88 |
| 5,435,915 A | 7/1995 | Connors, Jr. | 210/232 |
| 5,462,679 A | 10/1995 | Verdegan et al. | 210/798 |
| 5,533,554 A | 7/1996 | Young | 141/383 |
| 5,546,979 A | 8/1996 | Clark, II et al. | 137/318 |
| 5,558,140 A | 9/1996 | Clark, II | 141/98 |
| 5,681,461 A | 10/1997 | Gullett et al. | 210/232 |
| 5,694,990 A | 12/1997 | Crima | 141/330 |
| 5,695,636 A | 12/1997 | Gullett | 210/232 |
| 5,695,637 A | 12/1997 | Jiang et al. | 210/316 |
| 5,702,602 A | 12/1997 | Brown et al. | 210/342 |
| 5,704,383 A | 1/1998 | Kammeraad et al. | 137/15 |
| 5,711,872 A | 1/1998 | Jones et al. | 210/130 |
| 5,738,785 A | 4/1998 | Brown et al. | 210/232 |
| 5,762,788 A | 6/1998 | Gullett | 210/232 |
| 5,775,385 A | 7/1998 | Tackett, Sr. | 141/98 |
| 5,846,416 A | 12/1998 | Gullett | 210/232 |
| 5,858,224 A | 1/1999 | Schwandt et al. | 210/90 |
| 5,902,479 A | 5/1999 | Fukumori et al. | 210/248 |
| 5,906,221 A | 5/1999 | Mancell | 137/549 |
| 5,972,210 A | 10/1999 | Munkel | 210/90 |
| 6,033,578 A | 3/2000 | Loewen | 210/767 |
| 6,068,762 A | 5/2000 | Stone et al. | 210/90 |
| 6,068,763 A | 5/2000 | Goddard | 210/130 |
| 6,084,915 A | 7/2000 | Williams | 375/242 |
| 6,090,276 A | 7/2000 | Ford | 210/167 |
| 6,139,725 A | 10/2000 | Barr | 210/90 |
| 6,168,722 B1 | 1/2001 | Olsen et al. | 210/767 |
| 6,267,875 B1 | 7/2001 | Leo | 210/90 |
| 6,270,660 B1 | 8/2001 | Roll et al. | 210/131 |
| 6,319,402 B1 | 11/2001 | Schwandt et al. | 210/323.2 |
| 6,319,417 B1 | 11/2001 | Rodibaugh | 210/787 |
| 6,378,706 B1 | 4/2002 | Verdegen et al. | 210/411 |
| 6,391,193 B1 | 5/2002 | Luka | 210/130 |
| 6,422,395 B1 | 7/2002 | Verdegen et al. | 210/411 |
| 6,444,123 B1 | 9/2002 | Caiozza | 210/223 |
| 6,478,958 B1 | 11/2002 | Beard | 210/323.2 |
| 6,485,637 B2 | 11/2002 | Jainek et al. | 210/130 |
| 6,488,848 B1 | 12/2002 | Smith | 210/301 |
| 6,540,914 B1 | 4/2003 | Smith | 210/297 |
| 6,544,412 B2 | 4/2003 | Michels et al. | 210/130 |
| 6,551,506 B2 | 4/2003 | Caiozza | 210/222 |
| 6,585,887 B2 | 7/2003 | Michels et al. | 210/130 |
| 6,626,299 B1 * | 9/2003 | Brown et al. | 210/450 |
| 6,641,742 B2 | 11/2003 | Prater et al. | 210/767 |
| 6,666,968 B2 | 12/2003 | Smith et al. | 210/254 |
| 6,679,990 B2 | 1/2004 | Reinhart | 210/232 |
| 6,758,969 B2 | 7/2004 | Caiozza | 210/223 |
| 6,758,980 B2 | 7/2004 | Prater et al. | 210/767 |
| 6,770,110 B1 | 8/2004 | Seifert et al. | 55/498 |
| 6,783,665 B1 | 8/2004 | Girondi | 210/86 |
| 6,787,033 B2 | 9/2004 | Beard | 210/323.2 |
| 6,793,818 B1 | 9/2004 | Entringer et al. | 210/238 |
| 6,800,200 B2 * | 10/2004 | Bassett et al. | 210/315 |
| 6,863,811 B2 | 3/2005 | Janik | 210/232 |
| 6,872,304 B1 | 3/2005 | Gebert | 210/232 |
| 6,893,555 B2 * | 5/2005 | Roper et al. | 210/136 |
| 2003/0196948 A1 | 10/2003 | Bassett et al. | 210/315 |
| 2005/0126965 A1 | 6/2005 | Meddock et al. | 210/132 |

FOREIGN PATENT DOCUMENTS

| | | |
|---|---|---|
| FR | 1264502 | 6/1961 |
| SU | 517700 | 6/1976 |

* cited by examiner

EXAMPLE

COAXIAL FULL-FLOW AND BYPASS OIL FILTER HAVING CAP WITH BLADES

CROSS-REFERENCE TO RELATED APPLICATIONS

This application claims priority to and is a divisional of U.S. patent application entitled, COAXIAL FULL-FLOW AND BYPASS OIL FILTER APPARATUS AND METHOD, filed Jan. 20, 2006, having a Ser. No. 11/335,832, which is a continuation-in-part of U.S. patent application entitled COAXIAL FULL-FLOW AND BYPASS OIL FILTER, filed Dec. 15, 2003, having a Ser. No. 10/734,977, now U.S. Pat. No. 7,090,773, both of the disclosures of which are hereby incorporated by reference in their entirety.

FIELD OF THE INVENTION

The present invention relates generally to fluid filters. More specifically, the present invention concerns a fluid filter for lubrication, hydraulic, or coolants, for example engines, transmissions, or other machinery.

BACKGROUND OF THE INVENTION

In a powered vehicle having a lubricated transmission, it is desirable to filter debris (e.g., solid particles, impurities, etc.) out of the fluids in the engines, transmissions, or machinery sump prior to the fluid entering the pump. Known prior art filters utilize a porous filter media fluidly interposed between the fluid sump and pump to filter the fluid. Unfortunately, these prior art filters may be problematic because they may not be able to filter the fluid to the extent desired.

The typical oil filter system is a single pass, full flow filter that cleans the oil as it circulates. To more completely cleanse the oil, and to enable longer service life of the oil and automotive components, additional, supplemental filtration in the form of by pass filtration is often utilized. By pass filtration may be achieved by diverting a small portion of the oil flow through a denser filter media than provided in the full flow filter.

However, by pass filtration may be problematic for several reasons. Some of the by pass filter products may require special mounting brackets, remote filter head adapters or lengthy connecting hoses. Further, the rate of oil flow through the by pass portion of the filter system may be smaller than the rate of flow required.

Accordingly, it is desirable to provide a method and apparatus of sufficiently cleansing a fluid that is easily adaptable to engines, transmissions, or machinery, requiring little or no modification. Further, it is desirable to provide a method and apparatus that delivers the fluid at a desirable rate.

SUMMARY OF THE INVENTION

The foregoing needs are met, to a great extent, by the present invention, wherein in one aspect an apparatus is provided that in some embodiments filters fluid in engines, transmissions, or machinery.

In accordance with one embodiment of the present invention, a fluid filter includes a first filter, a second filter adjacent the first filter, a housing surrounding the first and second filters, having a first end and a second end, an inlet located at the first end, a first outlet, and a second outlet located at the second end.

In accordance with another embodiment of the present invention, a fluid filter includes a first filter, a second filter adjacent the first filter, a housing surrounding the first and second filters, having a first end and a second end, an inlet, a first outlet located at the first end, and a second outlet located at the second end.

In accordance with yet another embodiment of the present invention, a fluid filter includes a first filter, a second filter adjacent the first filter, a housing surrounding the first and second filters, wherein the housing comprises a spin-on or other canister body, filter can, or cartridge case with a removable canister cap, an inlet, a first outlet, and a second outlet disposed on the removable canister cap.

In accordance with yet another embodiment of the present invention, a fluid filter includes a first filter, a second filter coaxial with the first filter, an inlet coaxial with the first and second filters, a first outlet, coaxial with the first and second filters, and a second outlet coaxial with the first and second filters.

In accordance with yet another embodiment of the present invention, a fluid filter includes a first filter, a second filter adjacent the first filter, a housing surrounding the first and second filters, an inlet located at the first end, a first outlet located at the first end, and a second outlet located at a distal end from the inlet.

In accordance with yet another embodiment of the present invention, a method of filtering fluid includes providing a cylindrical housing, inserting a first tubular filter into the housing, inserting a second tubular filter into the housing, coaxial with the first tubular filter, providing an inlet on the housing, and providing a first outlet and a second outlet on the housing wherein the second outlet is at a distal end from the first outlet.

In accordance with yet another embodiment of the present invention, a fluid filter system includes means for primary filtration of a fluid resulting in a primary fluid, means for secondary filtration of the fluid resulting in a secondary fluid, means for delivering the primary fluid to a sump, and means for separately delivering the secondary fluid to the sump, wherein the means for primary filtration and the means for secondary filtration are coaxial.

There has thus been outlined, rather broadly, certain embodiments of the invention in order that the detailed description thereof herein may be better understood, and in order that the present contribution to the art may be better appreciated. There are, of course, additional embodiments of the invention that will be described below and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of embodiments in addition to those described and of being practiced and carried out in various ways. Also, it is to be understood that the phraseology and terminology employed herein, as well as the abstract, are for the purpose of description and should not be regarded as limiting.

As such, those skilled in the art will appreciate that the conception upon which this disclosure is based may readily be utilized as a basis for the designing of other structures, methods and systems for carrying out the several purposes of the present invention. It is important, therefore, that the

DETAILED DESCRIPTION

The invention will now be described with reference to the drawing figures, in which like reference numerals refer to like parts throughout. An embodiment of the present invention provides a high-quality, dependable, combination full flow and bypass filter for fluids, such as lubricating, hydraulic, or coolants, for example engines, transmissions, other machinery.

An embodiment of the present invention combines two coaxial cylindrical oil filters with a recovery system for returning the oil from the bypass filter to the sump, reservoir, or other relatively low-pressure destination. The bypass filter provides greater filtration of the fluid than available with just one filter. The bypass filter removes solid contaminants from a fraction of the engine oil, transmission fluid or any lubricating and/or hydraulic fluid, that enters the subject filter, and this clean fraction is returned to the engine oil supply, transmission fluid supply, hydraulic fluid reservoir or the like, resulting in a steadily increasing level of oil cleanliness until a steady-state of cleanliness is reached. While the exemplary embodiments detailed below are in the context of engine oil and/or transmission fluid, these or other embodiments can be suitable to filter other fluids including, for example, other automotive fluids, other lubricants and other hydraulic fluids.

Some embodiments of the present invention use a non-Venturi method of moving a fraction of the oil from the full flow filter through the bypass filter, unlike the previous state of the art filters. There are several embodiments of the present invention presented, for example, a completely disposable system and a replaceable system.

The replaceable system possesses a metal full-pass filter screen and a replaceable bypass filter element made of fiber, which can be removed from the filter canister and replaced with a new bypass filter element.

Figure 1:
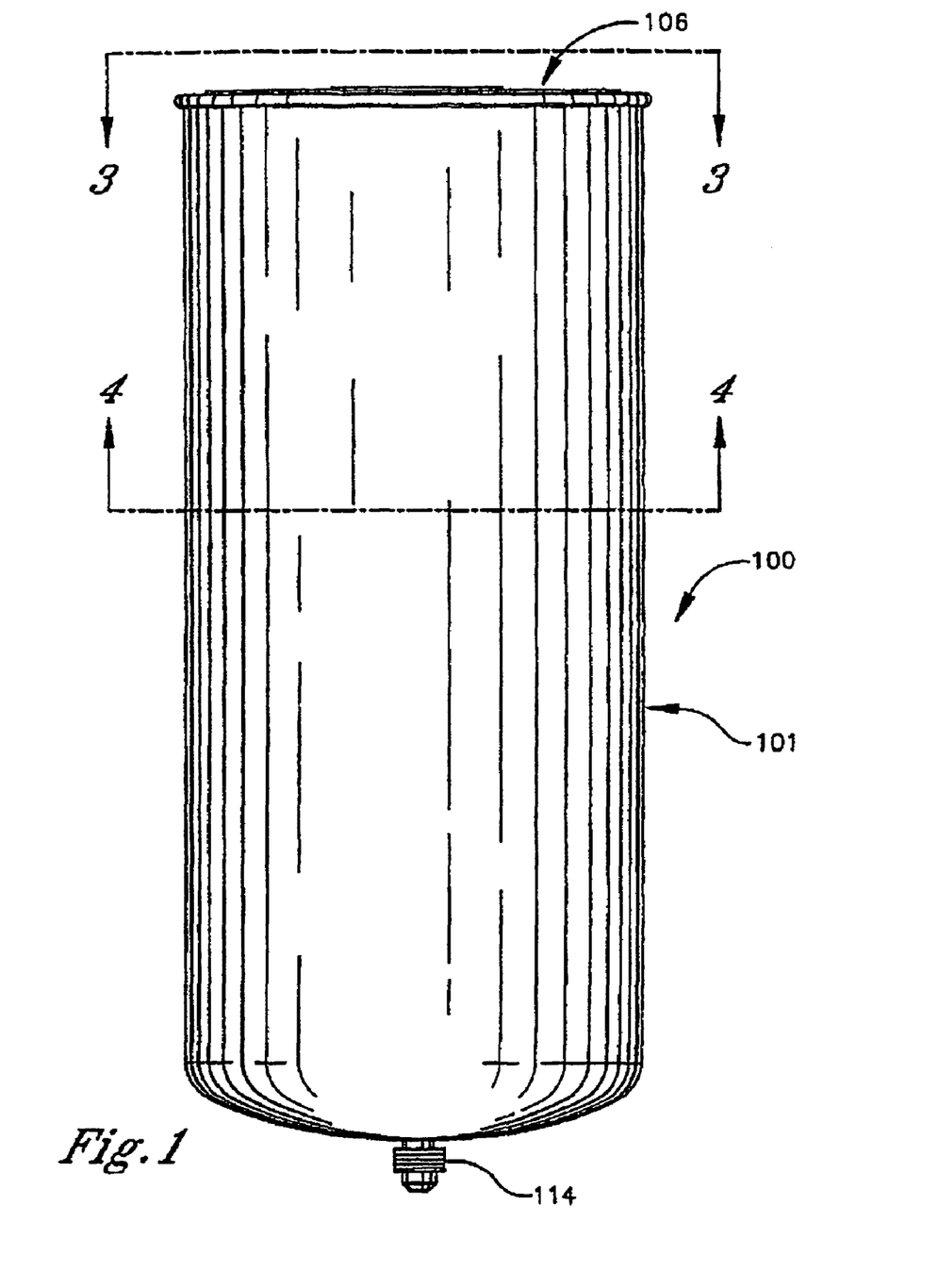
FIG. 1 is a side view illustrating an exterior of a canister filter according to an embodiment of the invention.
Figure 2:
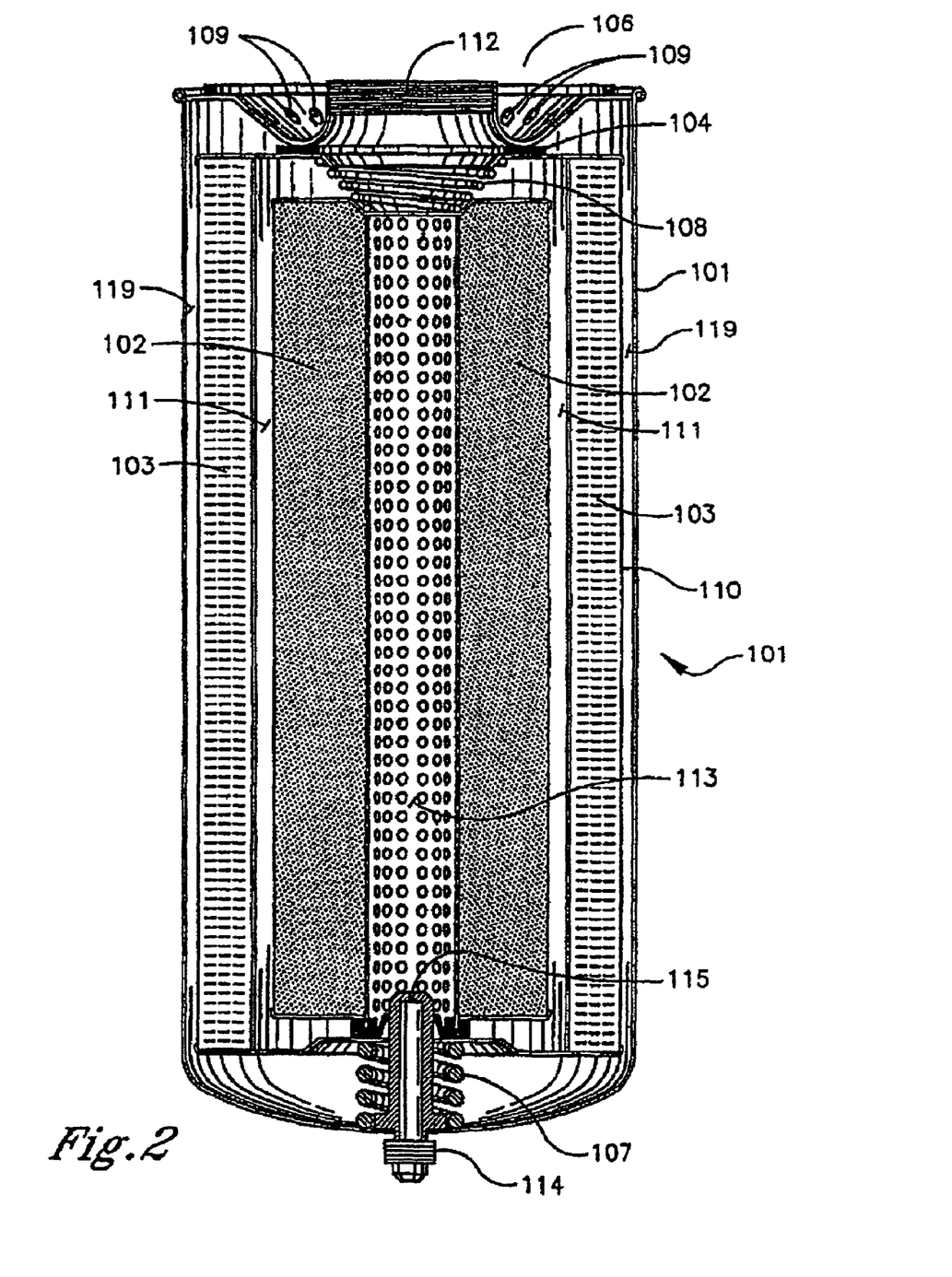
FIG. 2 is a cutaway view of the canister filter of FIG. 1.
Figure 3:
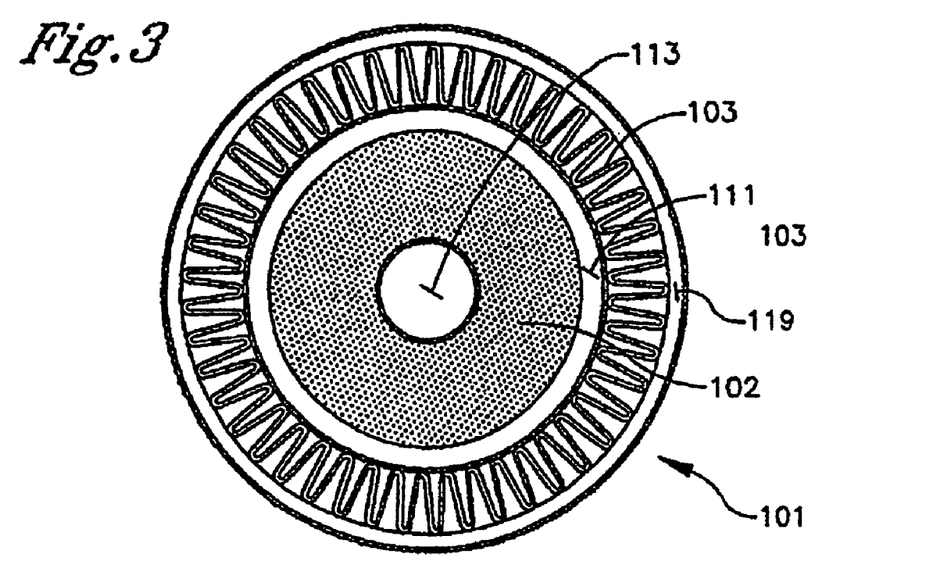
FIG. 3 is a cross-sectional view taken along the 3-3 in FIG. 1.
Figure 4:
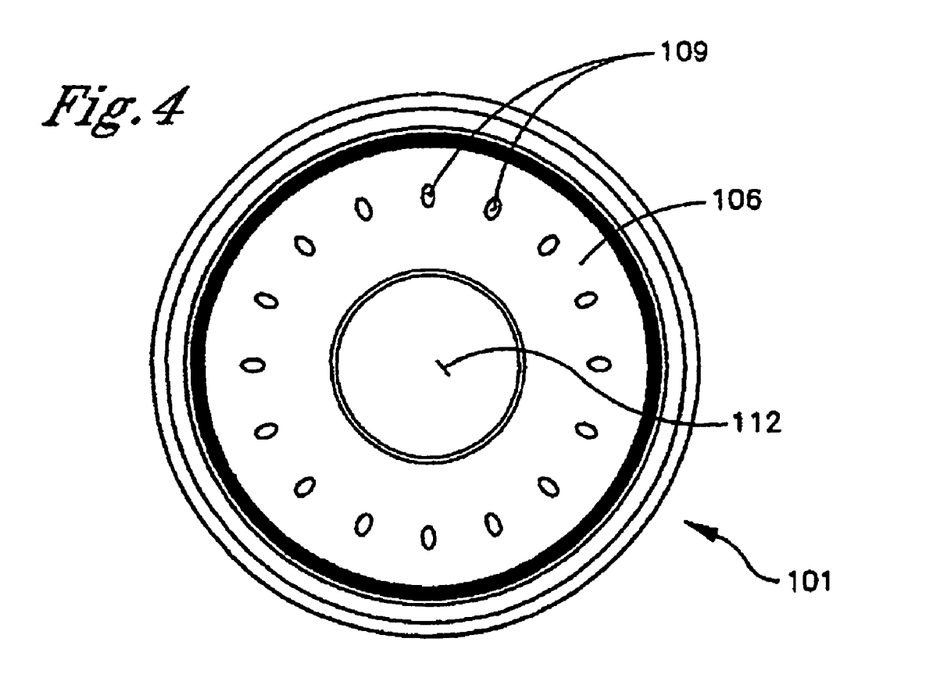
FIG. 4 is a bottom view taken along the 4-4 in FIG. 1.
Figure 5:
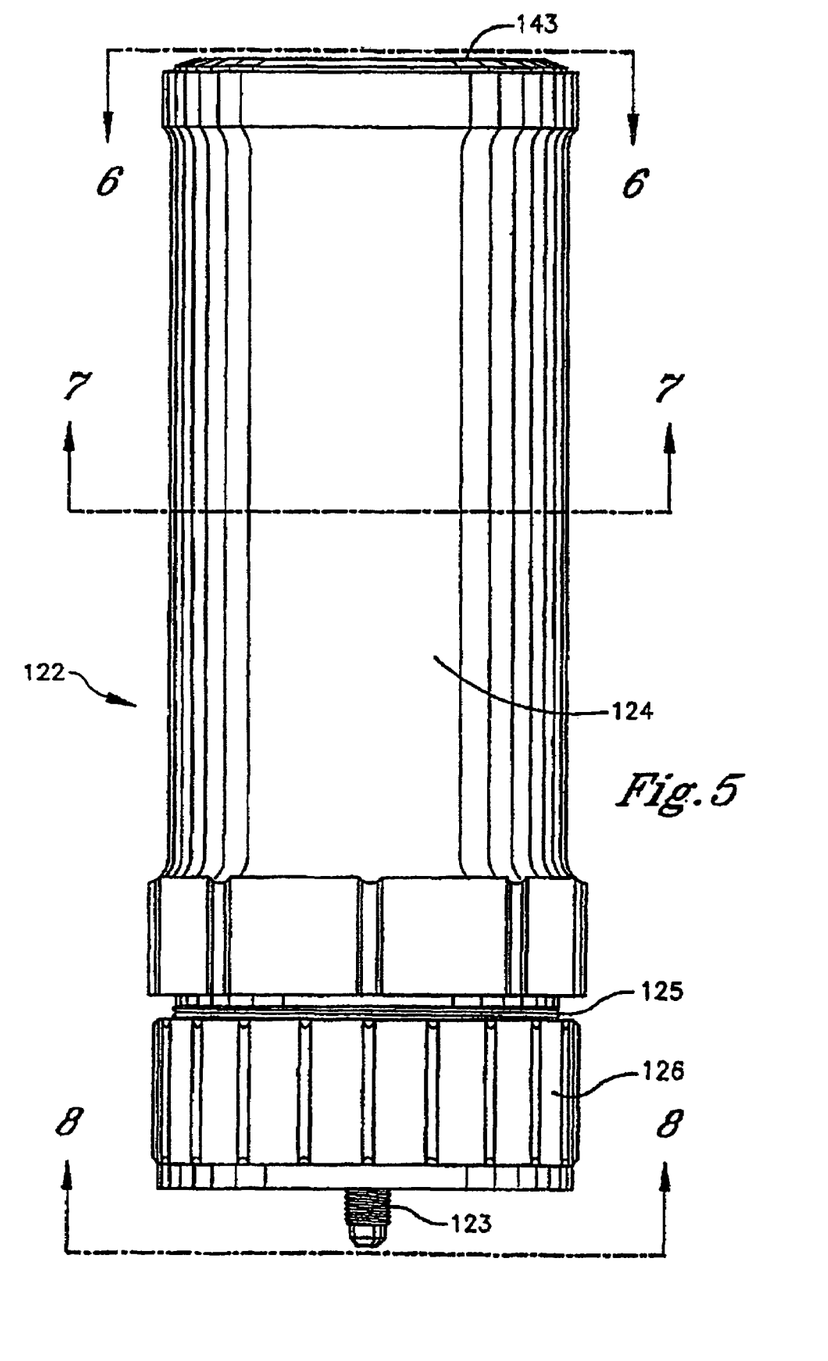
FIG. 5 illustrates is a side view of an exterior of a canister filter according to another embodiment of the invention.
Figure 6:
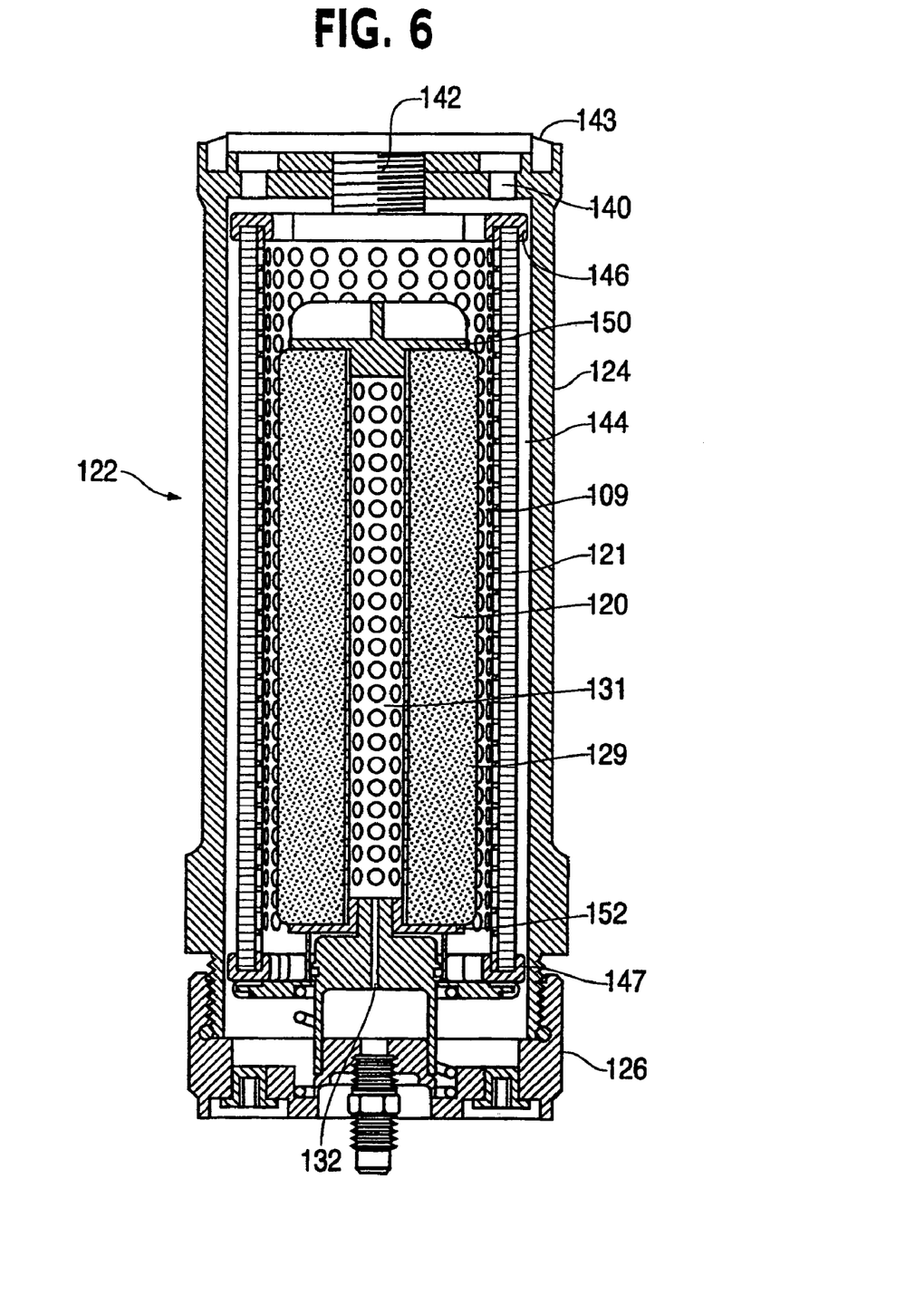
FIG. 6 is a cutaway view of the canister filter taken along the 6-6 in FIG. 5.
Figure 7:
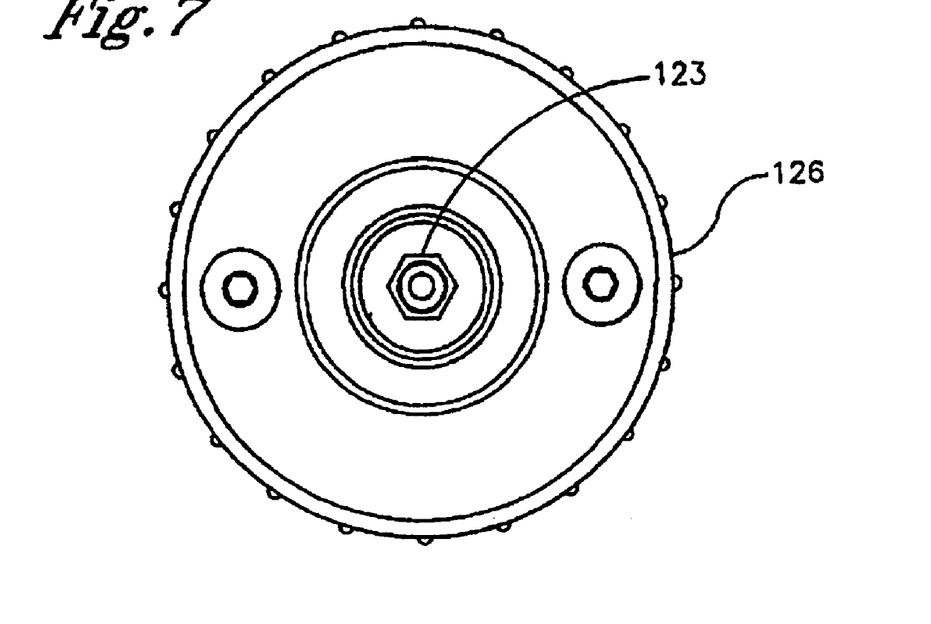
FIG. 7 is a top view taken along the 7-7 in FIG. 5.
Figure 8:
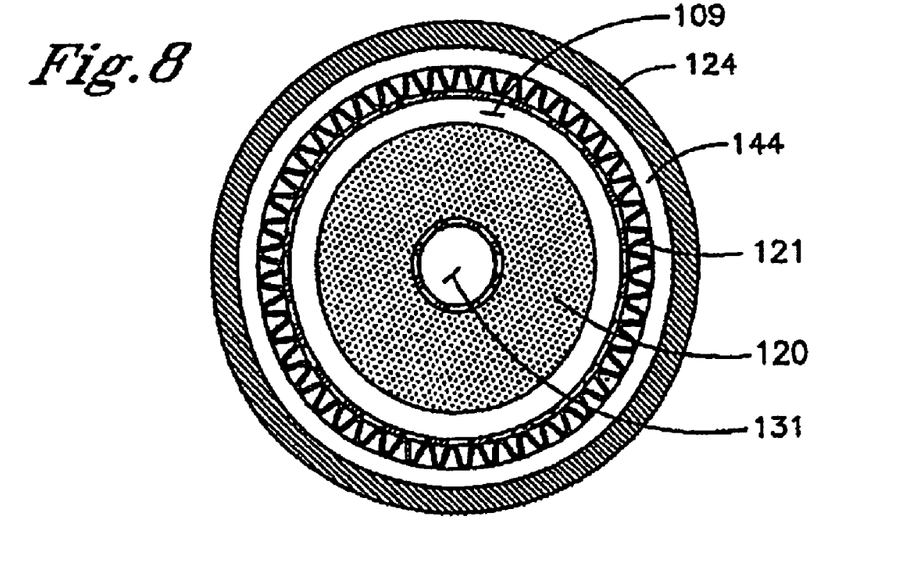
FIG. 8 is a cross-sectional view taken along the 8-8 in FIG. 5.
Figure 9:
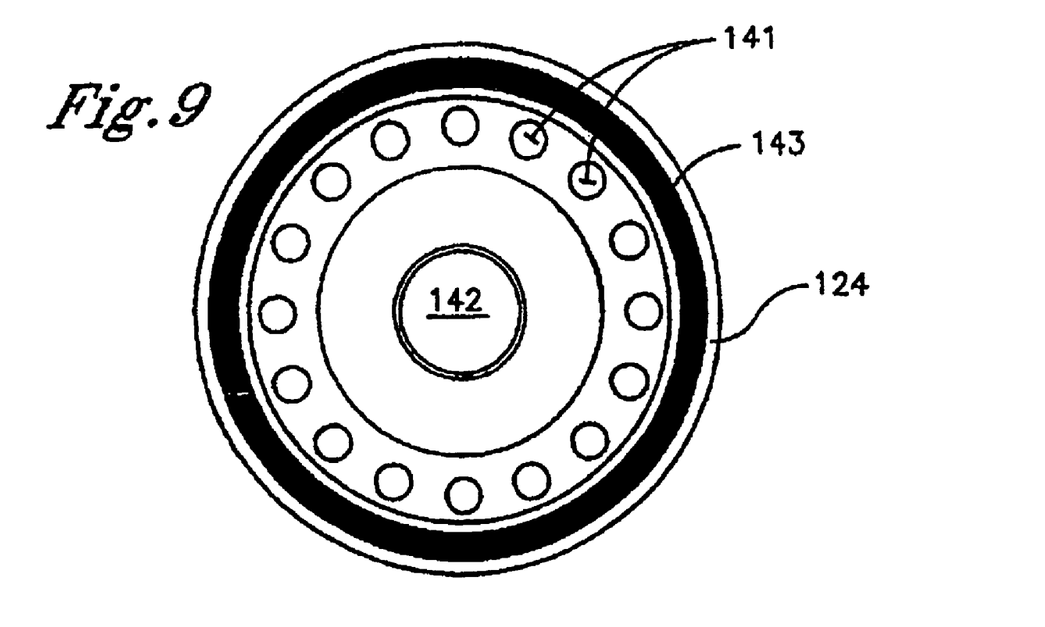
FIG. 9 is a bottom view of the canister filter of FIG. 5

FIG. 1 is a side view illustrating an exterior of a canister filter according to an embodiment of the invention. FIG. 2 is a cutaway view of the canister filter of FIG. 1. FIG. 3 is a cross-sectional view taken along the 3-3 in FIG. 1. FIG. 4 is a bottom view taken along the 4-4 in FIG. 1. Referring to FIGS. 1-4, an embodiment of the invention 100, the disposable system embodiment is shown. The general structure of the invention is a canister 101 surrounding two coaxial filters, the bypass filter 102 with a smaller diameter than the full flow filter 103. The bypass filter 102 is placed within the hollow interior of the full flow filter 103 as shown. The full flow filter 103 is held against the full flow gasket 104 near the threaded mounting flange, "Tapping plate" 106 (or other) of the canisters 101 by a large spring 107 while the bypass filter is held against the bypass gasket by a small spring 108.

The operation of the filter is that fluid enters the canister 101 through perforations 109 in the tap plate 106 and flows down the outer circumferential area 119 of the canister, entering the full flow filter 103 circumferentially at the outside surface 110 of the full flow filter 103 and proceeding towards the axis of the filter under pressure. The fluid then enters the transition space 111 between the filters and most of that fluid exits the filter canister 101 and directly enters the engines, transmissions, or machinery through the discharge opening 112 of the tap plate 106. A fraction of the oil in the transition space 111 enters the bypass filter 102 and exits the bypass filter 102 into the bypass collection space 113, whereupon it exits the filter canister through the bypass flow control orifice 115 and discharge port 114.

The bypass discharge port 114 is connected via a hose (not shown) to some low pressure point within the engines, transmissions, or machinery where oil can be returned to the sump. The difference in pressure between the fluid entering the canister 101 and the pressure at the destination of the hose from the bypass return port 114 draws a measurable fraction of the total system oil flow through the denser bypass filter 102. Eventually, all of the fluid passes through the bypass filter 102 and is cleaned to the dimensions allowed by the bypass filter 102. It is a feature of this invention that the fluid is not blended when it leaves the canister, but the bypass filter 102 output is separately directed to the oil sump or other destination.

The bypass filter 102 is comprised from a list of materials such as wound cotton and other dense fibers. The full flow filter 103 is comprised of a material selected from a list including pleated paper and metal mesh.

An alternate embodiment of the present invention in FIGS. 5 through 9 involves a disposable bypass filter element 120 and a cleanable filter screen 121, made of steel in the preferred instantiation of this embodiment. The filter canister system 122 is held together at the end where the bypass return port 123 exits by means of screw threads 125, where the canister body 124 is connected to the canister bottom cap 126. When the canister bottom cap 126 is unscrewed, the cleanable filter screen 121 can be lifted out and cleaned, later to be replaced. The used bypass filter 120 can be replaced with a clean one, the bottom cap 126 screwed back on with the entire unit remaining connected to the engines, transmissions, or machinery As an alternative to the cleanable filter screen 121, a standard pleated paper full flow filter may be used in this design, allowing the filters to be replaceable.

The fluid flow path is similar to the preferred embodiment. Fluid enters from the engines, transmissions, or machinery directly into the chamber 140 and then passes through several flow passages 141 arrayed circumferentially around the full flow discharge opening 142 at the base of the canister body 124. Fluid then flows down the canister sides 144 and traverses the filter screen 121 to the transition space 129, where under differential pressure, a fraction of the fluid enters the bypass filter 120 and makes it through to the interior of the filter 131, where it exits through the bypass return orifice 132.

The gasket 143 for the replaceable embodiment seals the combined full flow/bypass filtration system to the filter mount, transmission or machinery. (Filter mount not shown). Gaskets 146, 147 prevent the oil from taking a short-cut from the chamber 140 to the transition space 129 or from the canister sides 144 to the transition space 129.

The four-bladed anti-blockage cap 150 on top of the bypass filter 120 prevents the bypass filter 120 from blocking oil flow through the rest of the filter, through the filter screen 121, in the event the bypass filter 120 breaks free of its mount 152 inside the filter canister. If that should happen, without the four-bladed anti-blockage cap 150 present, the bypass filter 120 could plug the full flow discharge opening 142, starving the engines, transmissions, or machinery for oil and causing catastrophic failure.

The dimensions of the disposable filter's bypass return orifice 115 and its equivalent on the replaceable embodiment are important to the effectiveness of the bypass filter 102, 120. A dimension of 1 millimeter may be used for this outlet from the bypass filters 102, 120.

An embodiment of this invention that this full flow and bypass filter canister system may be compatible with existing engines, transmissions, or machinery mounts and requires no special equipment be mounted.

Figure 10:
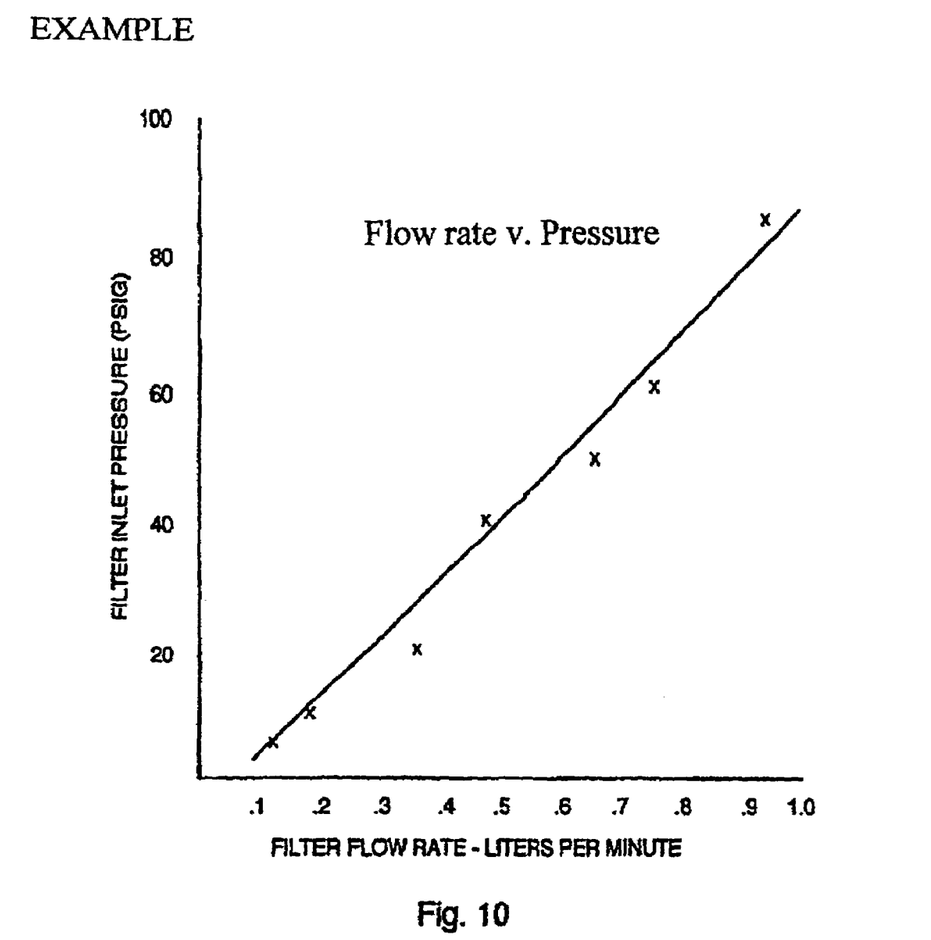
FIG. 10 is a chart showing measured output from a bypass filter as a function of filter inlet pressure.

Positive fluid flow may be demonstrated through both filters of the system at any engine speed. In FIG. 10, the almost linear output of pure oil from the bypass filter 102 through the bypass flow control orifice 115 is shown for an embodiment of the present invention.

While several embodiments of the present invention have been described, modifications can be made and other embodiments of this invention realized without departing from the intent and scope of any claims associated with this invention.

The many features and advantages of the invention are apparent from the detailed specification, and thus, it is intended by the appended claims to cover all such features and advantages of the invention which fall within the true spirit and scope of the invention. Further, since numerous modifications and variations will readily occur to those skilled in the art, it is not desired to limit the invention to the exact construction and operation illustrated and described, and accordingly, all suitable modifications and equivalents may be resorted to, falling within the scope of the invention.

What is claimed is:

1. A fluid filter comprising:
    a cylindrical housing having a first housing end and an opposite second housing end;
    a fluid outlet centrally disposed at the first housing end;
    a fluid inlet annularly disposed about the fluid outlet at the first housing end;
    a full flow filter disposed within the cylindrical housing, the full flow filter being cylindrical in shape and concentrically disposed in axial alignment with a central axis of the cylindrical housing;
    a first fluid flow path annularly disposed between an outer surface of the cylindrical housing and an outer surface of the full flow filter, the first fluid flow path being sealed at the second housing end, the first fluid flow path to fluidly connect the fluid inlet to the outer surface of the full flow filter;
    a bypass filter being disposed within the full flow filter, the bypass filter being cylindrical in shape and concentrically disposed in axial alignment with the central axis of the cylindrical housing;
    a cap disposed at a first end of the bypass filter proximal to the first housing end, the cap sealing the first end of the bypass filter;
    a plurality of blades disposed on the cap, the plurality of blades having different respective planes residing in alignment with the central axis of the cylindrical housing;
    a second fluid flow path annularly disposed between an interior surface of the full flow filter and an exterior surface of the bypass filter, the second fluid flow path to fluidly connect the interior surface of the full flow filter to the fluid outlet and to fluidly connect the interior surface of the full flow filter to the exterior surface of the bypass filter;
    a bypass outlet centrally disposed at the second housing end; and
    a third flow path disposed along a central axis of the fluid filter, the third flow path being sealed at the first housing end, the third flow path to fluidly connect an interior surface of the bypass filter to the bypass outlet.

2. The fluid filter of claim 1, wherein the fluid filter is a transmission fluid filter.

3. The fluid filter of claim 1, wherein the fluid filter is an engine fluid filter.

4. The fluid filter of claim 1, wherein the fluid filter is an hydraulic fluid filter.

5. The fluid filter of claim 1, wherein the bypass filter comprises a fibrous media.

6. The fluid filter of claim 1, wherein the bypass filter is replaceable.

* * * * *